United States Patent
Sumi et al.

(10) Patent No.: US 6,737,490 B2
(45) Date of Patent: May 18, 2004

(54) TETRAFLUOROETHYLENE/PERFLUORO (ALKYL VINYL ETHER) COPOLYMER AND METHOD FOR ITS PRODUCTION

(75) Inventors: Naoko Sumi, Chiba (JP); Atsushi Funaki, Chiba (JP); Masao Umino, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/304,965

(22) Filed: Nov. 27, 2002

(65) Prior Publication Data

US 2003/0114615 A1 Jun. 19, 2003

Related U.S. Application Data

(63) Continuation of application No. PCT/JP01/04525, filed on May 30, 2001.

(30) Foreign Application Priority Data

May 30, 2000 (JP) ........................................ 2000-160567
Jun. 30, 2000 (JP) ........................................ 2000-197965

(51) Int. Cl.$^7$ .............................................. C08F 114/18
(52) U.S. Cl. ........................ 526/247; 526/250; 526/253
(58) Field of Search ................. 526/247, 250, 526/253

(56) References Cited

U.S. PATENT DOCUMENTS

| 3,635,926 A | * | 1/1972 | Gresham et al. ............ 526/206 |
| 3,642,742 A | | 2/1972 | Carlson |
| 4,262,101 A | * | 4/1981 | Hartwimmer et al. ......... 526/89 |
| 4,743,658 A | * | 5/1988 | Imbalzano et al. ...... 525/326.4 |
| 5,310,836 A | * | 5/1994 | Treat .......................... 526/204 |
| 5,641,571 A | * | 6/1997 | Mayer et al. ............... 428/402 |
| 2002/0028895 A1 | * | 3/2002 | Iwasaki et al. ............. 526/243 |
| 2002/0045782 A1 | * | 4/2002 | Hung et al. ................. 568/674 |

FOREIGN PATENT DOCUMENTS

| JP | 6-128335 | 5/1994 |
| JP | 7-126329 | 5/1995 |

OTHER PUBLICATIONS

"Modern Fluropolymers", John Wiley & Sons, 1997, p. 230, paragraghs 1, 2, (XP002182388).

* cited by examiner

Primary Examiner—Bernard Lipman
(74) Attorney, Agent, or Firm—Oblon, Spivak, McClelland, Maier & Neustadt, P.C.

(57) ABSTRACT

A tetrafluoroethylene (TFE)/perfluoro (alkyl vinyl ether) (PVE) copolymer and a method for producing the copolymer, wherein the molar ratio of polymerized units based on TFE/polymerized units based on PVE is in the range of from 98.1/1.9 to 95.0/5.0, and its melt flow rate at 372° C. is from 35 to 60 g/10 min., and a weight-average molecular weight/a number-average molecular weight is from 1 to 1.7. The copolymer of TFE/PVE is excellent in the mechanical properties and the injection molding properties.

17 Claims, No Drawings

TETRAFLUOROETHYLENE/PERFLUORO (ALKYL VINYL ETHER) COPOLYMER AND METHOD FOR ITS PRODUCTION

This application is a Continuation of International Application No. PCT/JP01/04525, filed May 30, 2001.

TECHNICAL FIELD

The present invention relates to a tetrafluoroethylene/perfluoro (alkyl vinyl ether) copolymer (hereinafter referred to as PFA) excellent in injection molding properties.

BACKGROUND ART

PFA is used in various fields, since it is excellent in heat resistance, chemical resistance, solvent resistance, etc. However, when PFA is molded by means of injection molding to obtain a molded product with a fine shape or a complex shape, there is a problem that the molded product is apt to have a roughened surface, leading to a low yield of the product.

In order to solve such a problem in the injection molding, a method has been considered wherein the molecular weight of PFA is lowered to reduce its melt viscosity. However, the mechanical properties of the product become deteriorated, while the molding properties of the PFA are improved. Under these situations, development of PFA has been required which has an excellent molding properties, mechanical properties, and less possibility of causing the surface roughness of the molded product.

DISCLOSURE OF THE INVENTION

The present invention provides PFA comprising polymerized units (A) based on tetrafluoroethylene and polymerized units (B) based on a perfluoro (alkyl vinyl ether), wherein the molar ratio of (A)/(B) is in the range of from 98.1/1.9 to 95.0/5.0, and its melt flow rate (hereinafter referred to as MFR) at 372° C. of from 35 to 60 g/10 min., and $M_w/M_n$ of from 1 to 1.7 ($M_w$ is a weight-average molecular weight and $M_n$ is a number-average molecular weight.).

Further, the present invention provides a method for producing the PFA, which comprises copolymerizing, in the presence of a polymerization initiator, tetrafluoroethylene (a), and a perfluoro (alkyl vinyl ether)(b) in a molar ratio (a)/(b) in the range of from 90/10 to 55/45, wherein the fluctuation range of the (a)/(b) in the copolymerization is controlled to be within the range of ±20% in the presence of a chain transfer agent.

BEST MODE FOR CARRYING OUT THE INVENTION

The PFA of the present invention comprises (A) and (B) and the molar ratio of (A)/(B) is in the range of from 98.1/1.9 to 95.0/5.0. When the content of (B) is too small, the mechanical properties of PFA will be deteriorated. When the content of (B) is too large, the thermal stability will be lowered. When the content of (A) is too small, the production of the copolymer will be adversely affected. The molar ratio of (A)/(B) is preferably in the range of from 98.1/1.9 to 97.0/3.0, since the mold-ability of the copolymer and the durability in the mechanical properties of the resulting molded product are excellent.

The perfluoro (alkyl vinyl ether) (b) forming (B) is preferably a perfluorovinyl ether having a perfluoroalkyl group which has a straight-chain structure, a branched-chain structure or a cyclic structure. As its specific example, perfluoro (methyl vinyl ether), perfluoro (ethyl vinyl ether), perfluoro (propyl vinyl ether), perfluoro (hexyl vinyl ether) and perfluoro (octyl vinyl ether) can be mentioned. Particularly preferred is (b) having a straight-chain perfluoroalkyl group with a carbon number of from 1 to 8.

MFR of the PFA in the present invention measured in accordance with ASTM D-3307, is in the range of from 35 to 60 g/10 min. When MFR is too small, the molded product will have roughened surface, when the molded product is molded in a precise shape or a complex shape. When MFR is too large, the thermal resistance and the mechanical properties of the product will be deteriorated. MFR is preferably in the range of from 40 to 55 g/10 min., more preferably from 40 to 50 g/10 min.

The PFA of the present invention has excellent durability in mechanical properties with a MIT flex life of at least 6500 times, particularly 8000 times, in spite of having a relatively high MFR value. Among the PFA of the present invention, it has been found that there is the following relation between MFR (x g/10 min.) and MIT flex life (y time):

$$Y > -875x + 40000$$

In the present invention, the $M_w/M_n$ of the PFA is in the range of from 1 to 1.7. The lower limit of $M_w/M_n$ is 1. It means that PFA having a $M_w/M_n$ of less than 1 cannot be produced. When $M_w/M_n$ is too large, the mechanical properties of the PFA will be practically insufficient. $M_w/M_n$ is preferably in the range of from 1.2 to 1.7.

When the PFA of the present invention is produced, a polymerization method is not limited and may be employed various polymerization methods such as a suspension polymerization method, an emulsion polymerization method, a solution polymerization method and a bulk polymerization method. As a polymerization initiator, a free radical type initiator, an oxidation-reduction type initiator, an ionizing radiation, heat, light, etc. may be employed. A free radical type initiator may be a bis (fluoroacyl) peroxide such as $(C_3F_7COO)_2$, a bis (chlorofluoroacyl) peroxide such as $(ClC_3F_6COO)_2$, a diacyl peroxide such as diisobutyryl peroxide, a dialkylperoxydicarbonate such as diisopropyl peroxydicarbonate, a peroxyester such as tert-butylperoxyisobutylate and tert-butylperoxypivalate, a peroxosulfate such as ammonium persulfate, an azobis-type initiator such as azobisisobutyronitrile, etc.

As a polymerization medium to be used for the various polymerization methods mentioned above may be mentioned hereinafter. In a solution polymerization, a hydrochlorofluorocarbon such as $CClF_2CF_2CClFH$ (hereinafter referred to as HCFC225 cb), a hydrofluorocarbon such as $CF_3CF_2CF_2CF_2CH_2CH_3$, $CF_3CF(CF_3)CFHCFHCF_3$, a chlorofluorocarbon such as $CCl_3F$ and $C_2Cl_3F_3$, an alcohol having a carbon number of from 4 to 6 such as sec-butyl alcohol and tert-butyl alcohol may be employed. In a suspension polymerization and an emulsion polymerization, water or a mixed medium of water and other medium may be employed. Such an other medium is preferably the one similar to the above-mentioned medium in a solution polymerization.

The preferred method for producing PFA of the present invention comprises copolymerizing tetrafluoroethylene (a), and a perfluoro (alkyl vinyl ether)(b) in a molar ratio (a)/(b) of from 90/10 to 55/45, in the presence of a polymerization initiator, wherein the fluctuation of the molar ratio of (a)/(b) in the copolymerization is controlled to be in the range of ±20% in the presence of a chain transfer agent.

In the preferred production method mentioned above, a molar ratio of (a)/(b) in the copolymerization is from 90/10 to 55/45, more preferably from 85/15 to 60/40 (molar ratio). If the molar ratio in copolymerization is not within the above range, the PFA of the present invention cannot be readily produced.

In the preferred production method mentioned above, it is important to control the fluctuation of the molar ratio of (b)/(a) in the copolymerization within the range of ±20%, more preferably within the range of ±15%. If the fluctuation exceeds ±20%, PFA having a $M_W/M_n$ of more than 1.7 is more likely to be produced.

In order to produce PFA having a $M_W/M_n$ of from 1 to 1.7, it is effective to maintain the monomer composition ratio of (a) to (b) in the polymerization system at a constant value as much as possible. When the monomer composition ratio fluctuates during the copolymerization, the molecular weight of the PFA obtained will vary to result in a large $M_W/M_n$, since (a) and (b) are different in their monomer reactivity. Accordingly, it is important to employ a polymerization operation which can maintain the monomer composition ratio at a constant value.

As such a specific polymerization operation, may be mentioned a method wherein the monomers having an almost same composition as the one in PFA to be produced in the copolymerization are supplied continuously to a polymerization tank. This method may be carried out in a continuous type polymerization system and a batch type polymerization system. However, this method causes such a problems described as follows. When the viscosity of polymerization system containing the resulting PFA, the monomers and the medium is increased at the last period of the copolymerization, there is a possibility that (b) cannot be supplied continuously and uniformly to the reaction system because (b) is in a liquid form, although (a) can be supplied continuously and uniformly to the reaction system because (a) is a gas form. As a result, there is high possibility that PFA having $M_W/M_n$ of more than 1.7 is produced.

More preferably, a method is employed wherein a copolymerization reaction is initiated by introducing a certain amount of (a) into a reaction system into which an entire amount of (b) has been charged. In this method, (a) is usually introduced to the reaction system after (b) has been charged. The operation is preferably employed that a part of (a) can be introduced to the reaction system together with (b), and that the residual (a) in a consumed amount can be introduced as the reaction proceeds.

In the method mentioned above wherein the entire amount of (b) is charged, it is preferred to charge a large amount of (b), since the fluctuation in the concentration of (b) in the copolymerization reaction system can be reduced even when (b) is consumed by the reaction. However, if the charge amount of (b) is too large, the charge amount of (a) will also be required to be increased, whereby the polymerization pressure will rise, such being undesirable from the viewpoint of a manufacturing equipment. Usually, the pressure of (a) is preferably in the range of from 0.1 to 10 MPa, more preferably in the range of from 0.5 to 3 MPa, most preferably in the range of from 1 to 2.5 MPa.

Further, it is preferred to use an operation method wherein the pressure of (a) is gradually reduced as (b) is consumed in the copolymerization reaction in order to minimize the fluctuation range of (b)/(a) in the polymerization site. It is particularly preferred to use an operation method which can maintain the monomer composition ratio of (b)/(a) in the polymerization site at constant level, since the distribution in the composition of the resulting PFA can be narrowed to reduce $M_W/M_n$. To narrow the distribution in the composition of PFA as described in the above method is considered to contribute the improvement in the mechanical properties of the PFA to be obtained.

The concentration of PFA, finally obtained, is preferably in the range of from 5 to 30 mass % based on the polymerization medium. This is because work efficiency of the facility will be lowered, when the concentration is too small.

In the preferred producing method mentioned above, it is important to copolymerize (a) and (b) in the presence of a chain transfer agent. As a specific example of the chain transfer agent, may be mentioned an alcohol having a carbon number of not larger than 3 such as methanol, ethanol and propanol, and an alkane having a carbon number of from 1 to 6 such as methane, ethane, pentane and cyclohexane. Particularly preferred is methanol since its handling is easy.

The amount of the chain transfer agent may be varied depending on the kind of the chain transfer agent to be used. For example, when an alcohol e.g. methanol is employed as the chain transfer agent in a suspension polymerization, the amount of the alcohol is preferably in the range of from 10 to 20 mass % based on an aqueous polymerization medium. Further, when an alkane such as methane and ethane is employed as the chain transfer agent in a suspension polymerization, the amount of the alkane is preferably in the range of from 0.01 to 3 mass % based on an aqueous polymerization medium. These amounts of the chain transfer agents are preferred from the viewpoint of maintaining MFR of PFA at from 35 to 60 g/10 min. Usually, the polymerization temperature is preferably in the range of from 0 to 100° C.

The PFA of the present invention may be molded in the sole form and may be also preferably molded in the form of a composition containing various additives. As such additives, may be mentioned carbon black for imparting electric conductivity, carbon fiber for imparting mechanical strength, other pigment, etc.

The PFA of the present invention may be molded by various molding methods including an injection molding, a compression molding, an extruding molding, a transfer molding and a blow molding. Among them is preferred an injection molding.

The PFA of the present invention may be used as a various products in a field such as a chemical industry, a semiconductor industry, an electric-electronic industry, etc. As a specific example of such products, may be mentioned a pipe and a fitting, a tube and a hose, a valve, a carrier for a silicon wafer, a film, a monofilament, a coating material for an electric cable, an insulating material for an electrode holder, a powdered paint for lining, etc.

The PFA of the present invention is excellent in an injection molding property whereby surface roughness hardly occurs even when it is molded into a product having a fine and a complex shape. Further, the PFA of the present invention is excellent in an injection molding property in comparison with conventional PFA, whereby it can be molded at a high speed, thereby reducing a melt-fracture. The molded product of the present invention is also excellent in mechanical properties such as long flex life.

In the present invention, $M_W/M_n$ is measured according to the method described in Polym. Eng. Sci., 29(1989),645 (W. H. Tuminello) and Macromol., 26(1993), 499 (W. H. Tuminello et al.) Namely, a storage modulus of elasticity G' (ω) of PFA using the frequency as a variable is measured at a temperature of 330° C. in the molten state. This G' (ω) represents an integrate of the molecular weight distribution. Quantitatively, the frequency axis is converted to the molecular weight axis by the formula (1) and the modulus of elasticity axis is converted to the distribution of the molecular weight axis by the formula (2). Herein, ω represents the frequency used for the measurement of the storage modulus of elasticity, $W_i$ represents a mass allotment to the molecular weight M corresponding to the certain frequency ω, $G_N^0$ represents a plateau modulus of elasticity, wherein $3.14 \times 10^5$ Pa is used as $G_N^0$. Further, by using the formula (3) and the literature value of log K=−15.7, it is converted to the absolute molecular weight.

Specifically, $[G'(\omega)/G_N^0]^{0.5}$ is plotted to log ω and is fitted to a continuous function by the following formula. Herein, i is an integer of from 1 to n, $A_i$, $B_i$ and $C_i$ are fitting parameter, and X is log ω.

$$1/\omega \propto M^{3.4} \quad (1)$$

$$W_i = 1 - [G'(\omega)/G_N^0]^{0.5} \quad (2)$$

$$\eta_0 = K(M_W)^{3.4} \quad (3)$$

$$1 - W_i = [G'(\omega)/G_N^0]^{0.5} \quad (4)$$
$$= \sum -A_i\{1 + \tanh[B_i(X + C_i)]\}$$

The obtained fitting curve is differentiated by log ω to obtain molecular weight distribution curve (MWD), and $M_n$ and $M_W$ are obtained from the following formula.

$$M_n = (Int(MWD))/(Int(MWD/M))$$

$$M_W = (Int(MWD \times M))/(Int(MWD))$$

wherein, $$Int\ (MWD) = \int (MWD) \cdot d\ \log\ \omega$$

$$Int\ (MWD \times M) = \int (MWD \times M) \cdot d\ \log\ \omega$$

$$Int\ (MWD/M) = \int (MWD/M) \cdot d\ \log\ \omega$$

Now, the present invention will be described specifically with reference to the following Examples. However, it should be understood that the present invention is by no means limited by those Examples. In the present invention, MIT flex life, the composition and the melting point of the fluorine-containing polymer were measured by the following method.

[MIT Flex Life]

PFA was press-molded at 340° C. to obtain a film having a thickness of from 0.220 to 0.236 μm. By stamping the film into a strip shape, the specimen with width of 12.5 mm were prepared. In accordance with ASTM D2176, bending tests were conducted at a load of 1.25 kg, the bending angle of ±135°, and a room temperature using a bending test machine MIT-D manufactured by Toyo Seiki Seisakusho Company Limited. MIT flex life means the number of bending times the specimen breaks.

[Composition of a Fluorine-Containing Polymer]

A film made of a fluorine-containing polymer having a thickness of 30 μm and its infrared spectrum was measured. The ratio (weight ratio) of (the absorption value at 2370 $cm^{-1}$)/(the absorption value at 985 $cm^{-1} \times 0.95$) was converted into a molar ratio of (polymerized units based on perfluoro (propyl vinyl ether)/polymerized units based on TFE).

[Melting Point of a Fluorine-Containing Polymer]

DSC manufactured by Seiko Denshi Company Limited was employed and 10 mg of the specimen was heated at a rate of 10° C./minute. The temperature at which the specimen was melted at a maximum was measured as a melting point.

EXAMPLE 1

A stainless steel polymerizatin tank having an internal capacity of 110 liter was evacuated and 47 kg of water, 29 kg of HCFC 225 cb (manufactured by Asahi Glass Company limited), 5.2 kg of parfluoro (propyl vinyl ether) (hereinafter referred to as PPVE), 7.5 kg of TFE and 5.5 kg of methanol were charged into the polymerization tank. While maintaining the temperature at 50° C., 300 ml of a polymerization initiator (a 0.25 mass % HCFC 225 cb solution of bis (perfluorobutyryl) peroxide was added to initiate the polymerization. During the polymerization, TFE was added to bring the pressure to be constant at 1.3 MPa. Since the polymerization rate was lowered as the polymerization proceeds, the above solution of the polymerization initiator was added intermittently to bring the polymerization rate to be almost constant. At the time when the amount of TFE reached 10 kg, the polymerization was terminated and 10.6 kg of a white powder of PFA was obtained.

The average content of polymerized units based on PPVE in PFA was 2.1 mol %. MFR was 41 g/10 min., $M_W/M_n$ was 1.59 and a melting point was 301° C. The reaction molar ratio of TFE/PPVE was 79.3/20.7 at the beginning of the polymerization and was 81.1/18.9 at the end of the polymerization. The fluctuation of PPVE/TFE was −11.0%, which was obtained by calculation. The MIT flex life of this PFA was 8574 times.

The resulting PFA was pelletized by a two-axis extruder. Using an injection molding machine J75SA (screw diameter: 40 mm) manufactured by Nihon Seikousho Company Ltd., a specimen having a size of 50 mm×100 mm×2 mm was obtained by injection molding at the conditions of cylinder temperature of 390° C., die temperature of 190° C., and injection rate of 60 mm/sec. Visual inspection of surface roughness of the specimen showed that the occuring rate of the surface roughness was 1%.

EXAMPLE 2

The polymerization was carried out in the same manner as in Example 1 except that 5.0 kg of PPVE was used, and that the polymerization pressure was changed to 1.2 MPa at a time when the introducing amounts of TFE reached 3.3 kg, and that the polymerization pressure was changed to 1.1 MPa at a time when the introducing amounts of TFE reached 6.6 kg. As a result, 10.8 kg of a white powder of PFA was obtained. The average content of polymerized units based on PPVE in PFA was 1.9 mol %. MFR was 46 g/10 min., $M_W/M_n$ was 1.52 and the melting point was 302° C. The reaction molar ratio of TFE/PPVE was 80/20 at the beginning of the polymerization and was 79/21 at the end of the polymerization. The fluctuation of PPVE/TFE was 5.7% obtaioned by the calculation. The MIT flex life of this PFA was 8200 times.

The resulting PFA was pelltized and the injection molding was carried out in the same manner as in Example 1. As a result, the occuring rate of the surface roughness was 0%.

EXAMPLE 3

The polymerization was carried out in the same manner as in Example 1 except that 5.7 kg of PPVE was used. As a result, 10.9 kg of a white powder of PFA was obtained. The average content of polymerized units based on PPVE in PFA was 2.4 mol %. MFR was 47 g/10 min., $M_W/M_n$ was 1.67 and a melting point was 299° C. The reaction molar ratio of TFE/PPVE was 77.8/22.2 at the beginning of the polymerization and was 79.9/20.1 at the end of the polymerization. The fluctuation of PPVE/TFE was −11.7% by the calculation. The MIT flex life of this PFA was 9400 times.

The resulting PFA was pelletized and the injection molding was carried out in the same manner as in Example 1. As a result, the occuring rate of the surface roughness was 0%.

EXAMPLE 4 (COMPARATIVE EXAMPLE)

The polymerization was carried out in the same manner as in Example 1 except that 3.4 kg of PPVE, 8.0 kg of TFE, and 3.8 kg of methanol were used. As a result, 10.8 kg of a white powder of PFA was obtained. The average content of polymerized units based on PPVE in the PFA was 1.4 mol %. MFR was 14 g/10 min., $M_W/M_n$ was 1.54 and a melting point was 307° C. The reaction molar ratio of TFE/PPVE was 86.2/13.8 at the beginning of the polymerization and was 87.6/12.4 at the end of the polymerization. The fluctuation of PPVE/TFE was −11.6% by the calculation.

The resulting PFA was pelletized and the injection molding was carried out in the same manner as in Example 1. As a result, the occuring rate of the surface roughness was 17%, and the injection molding properties were bad.

EXAMPLE 5 (COMPARATIVE EXAMPLE)

A stainless steel polymerizatin vessel having an internal capacity of 110 liter was evacuated and 52 kg of water, 7.2 kg of HCFC 225 cb, 2.1 kg of PPVE, 4.1 kg of TFE and 161 g of ammonium perfluorodecanoate were charged. Then, methane in an amount of 0.25 MPa in pressure difference at 27° C. was added, and heated to 70° C. 152 g of ammonium persulfate as a polymerization initiator was added to initiate the polymerization. During the polymerization, TFE was added to bring the pressure to be constant at 1.63 MPa. At a time when the amount of TFE reached 10 kg, the polymerization was terminated and 10.5 kg of a white powder of PFA was obtained.

The average content of polymerized units based on PPVE in PFA was 2.0 mol %. MFR was 38 g/10 min., $M_W/M_n$ was 1.72 and a melting point was 303° C. The reaction molar ratio of TFE/PPVE was 83.7/16.1 at the beginning of the polymerization and was 87.5/12.5 at the end of the polymerization. The fluctuation of PPVE/TFE was −25.7% obtained by the calculation. The MIT flex life of this PFA was 6300 times, which was poor.

The resulting PFA was pelletized and the injection molding was carried out in the same manner as in Example 1. As a result, the occuring rate of the surface roughness was 4%, and the injection molding properties were not satisfactory.

The entire disclosures of Japanese Patent Application No. 2000-160567 filed on May 30, 2000 and Japanese Patent Application No. 2000-197965 filed on Jun. 30, 2000 including specifications, claims and summaries are incorporated herein by reference in their entireties.

What is claimed is:

1. A tetrafluoroethylene/perfluoro (alkyl vinyl ether) copolymer comprising polymerized units (A) based on tetrafluoroethylene and polymerized units (B) based on a perfluoro (alkyl vinyl ether), wherein the molar ratio of (A)/(B) is in the range of from 98.1/1.9 to 95.0/5.0, and its melt flow rate at 372° C. is from 35 to 60 g/10 min., and $M_W/M_n$ is from 1 to 1.7 ($M_W$ is a weight-average molecular weight and $M_n$ is a number-average molecular weight).

2. The tetrafluoroethylene/perfluoro (alkyl vinyl ether) copolymer according to claim 1, wherein the molar ratio of (A)/(B) is in the range of from 98.1/1.9 to 97.0/3.0.

3. The tetrafluoroethylene/perfluoro (alkyl vinyl ether) copolymer according to claim 1, wherein the melt flow rate is from 40 to 55 g/10 min.

4. The tetrafluoroethylene/perfluoro (alkyl vinyl ether) copolymer according to claim 1, wherein $M_W/M_n$ is in the range of from 1.2 to 1.7.

5. The tetrafluoroethylene/perfluoro (alkyl vinyl ether) copolymer according to claim 1, wherein the perfluoro (alkyl vinyl ether) is a perfluoro (alkyl vinyl ether) having a perfluoroalkyl group of a carbon number of from 1 to 8.

6. The tetrafluoroethylene/perfluoro (alkyl vinyl ether) copolymer according to claim 1, wherein the melt flow rate is from 40 to 50 g/10 min.

7. A method for producing the tetrafluoroethylene/perfluoro (alkyl vinyl ether) copolymer as described in claim 1, which comprises copolymerizing, in the presence of a polymerization initiator and a chain transfer agent, tetrafluoroethylene (a) and a perfluoro (alkyl vinyl ether)(b) in a molar ratio (a)/(b) of from 90/10 to 55/45, wherein the fluctuation range of the molar ratio (a)/(b) in the copolymerization is controlled to be within the range of ±20%.

8. The method for producing the tetrafluoroethylene/perfluoro (alkyl vinyl ether) copolymer according to claim 7, wherein (a)/(b) is in the range of from 85/15 to 60/40.

9. The method for producing the tetrafluoroethylene/perfluoro (alkyl vinyl ether) copolymer according to claim 7, wherein the fluctuation range of the molar ratio (a)/(b) is controlled to be within the range of ±15%.

10. The method for producing the tetrafluoroethylene/perfluoro (alkyl vinyl ether) copolymer according to claim 7, wherein the chain transfer agent is an alcohol having a carbon number of 3 or less, or an alkane having a carbon number of from 1 to 6.

11. The method for producing the tetrafluoroethylene/perfluoro (alkyl vinyl ether) copolymer according to claim 7, wherein the chain transfer agent is methanol.

12. The method for producing the tetrafluoroethylene/perfluoro (alkyl vinyl ether) copolymer according to claim 7, wherein the polymerization pressure of tetrafluoroethylene is from 0.1 to 10 MPa.

13. The method for producing the tetrafluoroethylene/perfluoro (alkyl vinyl ether) copolymer according to claim 7, wherein the polymerization pressure of tetrafluoroethylene is from 0.5 to 3 MPa.

14. The tetrafluoroethylene/perfluoro (alkyl vinyl ether) copolymer according to claim 1, wherein injection molded pellets of said copolymer have an occurring rate of surface roughness of not greater than 1% when subjected to visual inspection.

15. The tetrafluoroethylene/perfluoro (alkyl vinyl ether) copolymer according to claim 1, wherein a film of said copolymer stamped into a strip shape, said film having been formed by press-molding, and tested according to ASTM D2176, has a minimum MIT flex life of 8200.

16. A molding of the copolymer according to claim 1.

17. The molding according to claim 16, which is an injection molding.

* * * * *